(12) United States Patent
Wurtenberger et al.

(10) Patent No.: US 9,002,404 B1
(45) Date of Patent: Apr. 7, 2015

(54) METHOD AND SYSTEM FOR MIGRATING FROM COAXIAL CABLE TO HYBRID CABLE BASE STATION INSTALLATIONS

(71) Applicant: Sprint Communications Company L.P., Overland Park, KS (US)

(72) Inventors: Andrew Mark Wurtenberger, Olathe, KS (US); Sreekar Marupaduga, Overland Park, KS (US); Patrick Jacob Schmidt, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 133 days.

(21) Appl. No.: 13/754,319

(22) Filed: Jan. 30, 2013

(51) Int. Cl.
*H04M 3/00* (2006.01)
*H04W 24/00* (2009.01)
*H04W 40/00* (2009.01)
*H04B 1/38* (2006.01)
*H04W 16/00* (2009.01)

(52) U.S. Cl.
CPC .................................. *H04W 16/00* (2013.01)

(58) Field of Classification Search
USPC .......... 455/66.1, 67.11, 403, 418–420, 422.1, 455/423–424, 446, 449, 453, 457, 459, 520, 455/561, 562.1; 725/118, 129; 333/117, 333/123
See application file for complete search history.

(56) References Cited

U.S. PATENT DOCUMENTS

| | | | | |
|---|---|---|---|---|
| 5,818,845 A * | 10/1998 | Moura et al. | ................... | 370/449 |
| 6,535,480 B1 * | 3/2003 | Bhagavath et al. | ........... | 370/225 |
| 6,850,533 B2 * | 2/2005 | Gerszberg et al. | ............ | 370/401 |
| 2002/0083476 A1 * | 6/2002 | McNamara | .................... | 725/148 |
| 2007/0028280 A1 * | 2/2007 | Bishop | ........................... | 725/129 |
| 2011/0116419 A1 * | 5/2011 | Cholas et al. | ................. | 370/259 |

* cited by examiner

*Primary Examiner* — Meless Zewdu

(57) ABSTRACT

Systems, methods, and computer-readable media for migrating from coaxial cable to hybrid cable base station installations with zero or partial down-time are provided. In embodiments, the method includes determining, based on operational measurement data, a sector associated with a base station having the least traffic. Each sector supported by two conduits feeding two coaxial cables to an antenna. A channel count associated with the determined sector is reduced so that all transmits fit on a single coaxial cable resulting in an unused conduit and an unused coaxial cable. A hybrid cable is installed and activated so that all traffic for the determined sector is moved to the hybrid cable. Additional hybrid cables are installed to replace unused coaxial cables until traffic for all sectors has been moved to hybrid cables, which frees half the conduits for other use.

14 Claims, 4 Drawing Sheets

METHOD AND SYSTEM FOR MIGRATING FROM COAXIAL CABLE TO HYBRID CABLE BASE STATION INSTALLATIONS

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, performing a method of migrating from coaxial cable to hybrid cable base system installations. In embodiments, operational measurement data is utilized to identify a sector associated with a base station with the least traffic. In embodiments, channel count associated with the sector is reduced until all transmits fit on a single coaxial cable for that sector resulting in an unused coaxial cable. The unused coaxial cable is removed and replaced with a hybrid cable. All traffic for the sector is moved from the used coaxial cable to the hybrid cable. In embodiments, remaining sector traffic is moved to hybrid cables that replace unused coaxial cables. This results in half the cable usage and frees up half the conduits.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
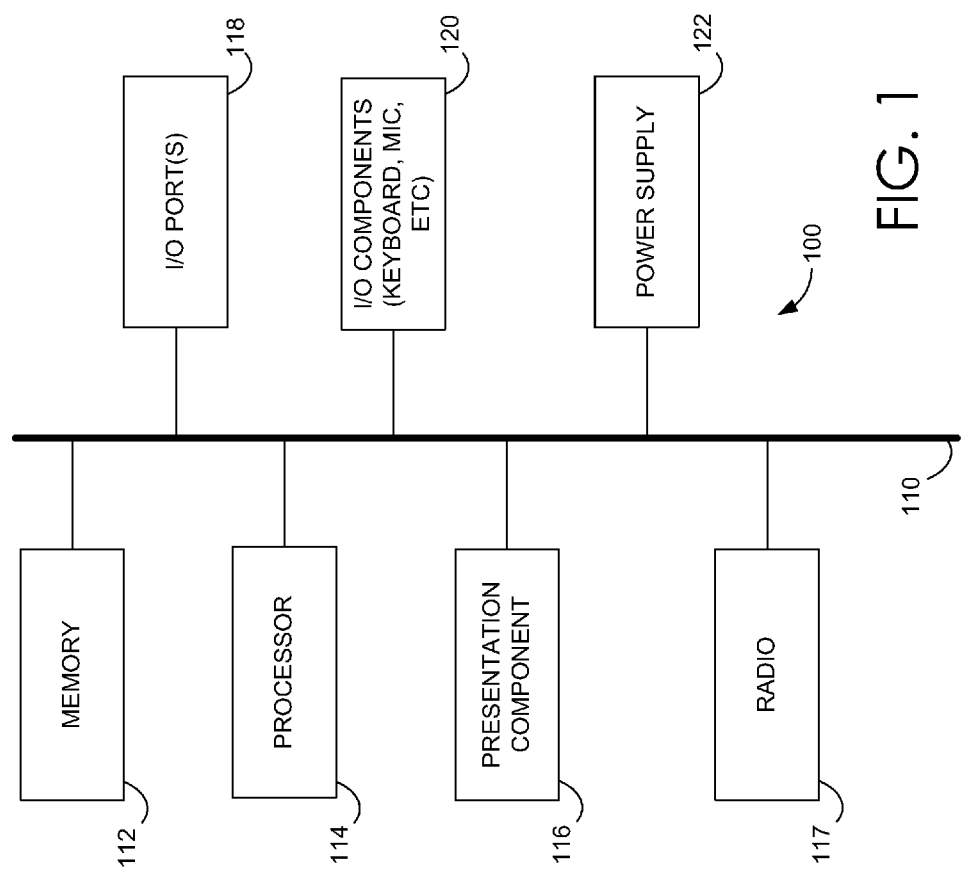
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

As technology improves, components of base stations are increasingly becoming distributed resulting in some components being installed on the rooftop next to an antenna rather than in the basement of a building. Often, this distribution of components requires upgraded cables that can deliver both power and data communication. Even in situations where components are not distributed between the rooftop and the basement or upgraded cables are required, base stations often need to be replaced. Telecommunications providers are frequently in the process of upgrading or replacing base station equipment. In either instance, outages and downtime are required to upgrade or replace the equipment. Typically these outages are done during off-peak hours. Unfortunately, these hours are typically during the nighttime. This results in safety issues for workers tasked with climbing a roof or antenna to accomplish the upgrade or replacement.

Embodiments of the present invention obviate the need for an outage or downtime and improve the safety of workers upgrading or replacing base station equipment. Embodiments of the present invention are directed to migrating from coaxial cable to hybrid cable base station installations. In embodiments, the base station is migrated from a ground based system to a roof top based network vision deployment. In embodiments, the ground based base station is replaced with another ground based base station. In embodiments, the migration is accomplished with zero or only partial downtime. For clarity, partial down-time represents a slightly degraded or less than optimal performance for a particular sector that may be attributed to a reduction in channel count for that sector or to temporarily moving traffic associated with that sector to another sector. In embodiments, the migration is accomplished without building additional conduits or installing more components (e.g., combiners, which often introduce additional issues such as intermodulation and uplink problems).

Accordingly, in one aspect, embodiments of the present invention are directed to computer storage media having computer-executable instructions embodied thereon that, when executed, perform a method of migrating from coaxial cable to hybrid cable base station installations. The method comprises: determining, based on operational measurement data, a first sector associated with a base station having the least traffic, each sector supported by two conduits feeding two coaxial cables to an antenna; reducing a channel count associated with the first sector so that all transmits fit on a single coaxial cable resulting in a first unused conduit, a first unused coaxial cable, a first used conduit, and a first used coaxial cable for the determined sector; receiving an indication the first unused coaxial cable has been removed; receiving an indication a first hybrid cable has been installed in the first unused conduit; activating the first hybrid cable so that all traffic for the determined sector is moved from the first used coaxial cable to the first hybrid cable; receiving an indicating the first used coaxial cable has been removed; receiving an indication a second hybrid cable has been installed in the first used conduit; activating the second hybrid cable so that all traffic for a second sector is moved from a third used coaxial cable in a third conduit and a fourth used coaxial cable in a fourth conduit; receiving an indication the third used coaxial cable and the fourth used coaxial cable have been removed from the third and fourth conduits; receiving an indication a third hybrid cable has been installed in the third conduit; and activating the third hybrid cable so that all traffic for a third sector is moved from a fifth used coaxial cable in a fifth conduit and a sixth used coaxial cable in a sixth conduit.

In another aspect, embodiments of the present invention are directed to a method for migrating from coaxial cable to hybrid cable base station installations. The method comprises: determining, based on operational measurement data, a first sector associated with a base station having the least traffic, each sector supported by two conduits feeding two coaxial cables to an antenna; reducing a channel count associated with the first sector so that all transmits fit on a single coaxial cable resulting in a first unused conduit, a first unused coaxial cable, a first used conduit, and a first used coaxial cable for the determined sector; receiving an indication the first unused coaxial cable has been removed; receiving an indication a first hybrid cable has been installed in the first unused conduit; and activating the first hybrid cable so that all traffic for the determined sector is moved from the first used coaxial cable to the first hybrid cable.

In yet another aspect, embodiments of the present invention are directed to a computer system for migrating from coaxial cable to hybrid cable base station installations. The computer system comprises a processor coupled to a computer-storage medium, the computer-storage medium having stored thereon a plurality of computer software components executable by the processor. The computer software components comprise: a determination component for determining, based on operational measurement data, a determined sector associated with a base station having the least traffic, each sector supported by two conduits feeding two coaxial cables to an antenna; a reduction component for reducing a channel count associated with the determined sector so that all transmits fit on a single coaxial cable resulting in a first unused conduit, a first unused coaxial cable, a first used conduit, and a first used coaxial cable for the determined sector; an removed indication component for receiving an indication when an unused coaxial cable has been removed from a conduit; an installed indication component for receiving an indication when a hybrid cable has been installed in a conduit; and an activation component for activating the hybrid component after the installed indication component indicates the hybrid cable has been installed.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| CDMA | Code Division Multiple Access |
| CD-ROM | Compact Disk Read Only Memory |
| CRM | Customer Relations Management |
| DVD | Digital Versatile Discs |
| EEPROM | Electrically Erasable Programmable Read Only Memory |
| ENODEB | Evolved Node B |
| GPRS | General Packet Radio Service |
| GPS | Global Positioning System |
| GSM | Global System for Mobile Communications |
| HLR | Home Location Register |
| iDEN | Integrated Digital Enhanced Network |
| LTE | Long Term Evolution |
| MSC | Mobile Serving Center |
| MMS | Multimedia Messaging Service |
| PC | Personal Computer |
| PCS | Personal Communications Service |
| PDA | Personal Digital Assistant |
| PLMN | Public Land Mobile Network |
| RAM | Random Access Memory |
| RF | Radio Frequency |
| ROM | Read Only Memory |
| SIB2 | SystemInformationBlockType2 |
| SLA | Service Level Agreement |

-continued

| | |
|---|---|
| SMS | Short Message Service |
| TDMA | Time Division Multiple Access |
| UMTS | Universal Mobile Telecommunications Systems |
| VoIP | Voice over IP |
| Wi-Fi | Wireless Fidelity |
| WiMAX | Worldwide Interoperability for Microwave Access |

Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
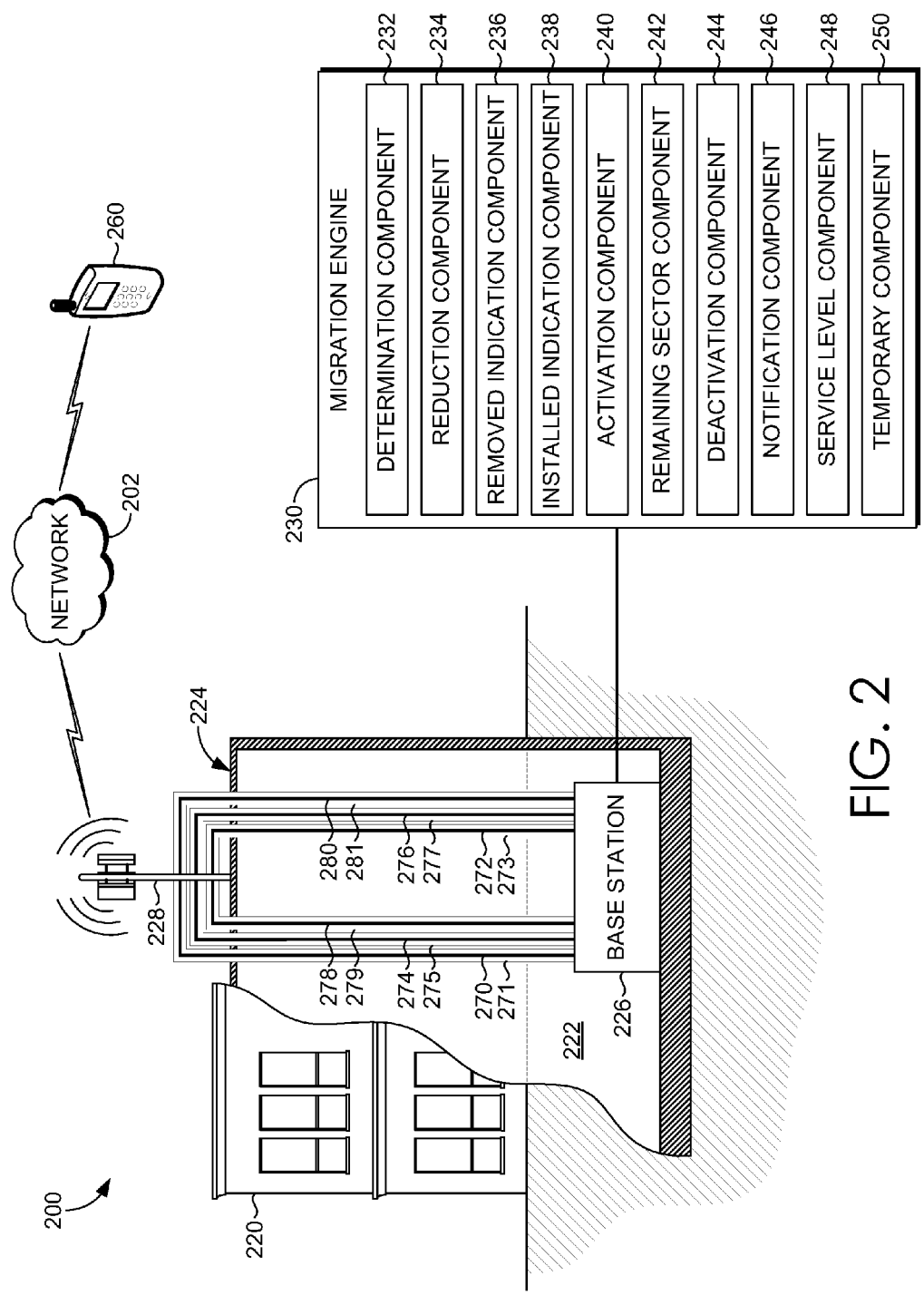
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 260 may communicate with other devices, such as mobile devices, servers, etc. The user device 260 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 210 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 260 can utilize a network 202 to communicate with other computing devices (e.g., a mobile device(s), a server(s), a personal computer(s), etc.). In embodiments, the network is a telecommunications network(s), or a portion thereof. A telecommunications network might include an array of devices or components (e.g., base station 226), some of which are not shown so as to not obscure more relevant aspects of the invention. Components such as terminals, links, and nodes (as well as other components) can provide connectivity in some embodiments. The network 202 can include multiple networks, as well as being a network of networks, but is shown in more simple form so as to not obscure other aspects of the present invention. The network can be part of a telecommunication network that connects subscribers to their immediate service provider. In embodiments, the network 202 can be associated with a telecommunications provider that provides services (e.g., LTE) to user devices, such as user device 260. For example, the network 202 may provide voice services to user devices or corresponding users that are registered or subscribed to utilize the services (e.g., LTE) provided by a telecommunications provider. The network 202 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

In embodiments, components of base station 226 may be deployed in the basement 222 of a building 220. An antenna 228 on the roof 224 of the building 220 supports multiple sectors. In a typical ground based base station deployment, two coaxial cables run from the base station 226 to the antenna 228 for each sector associated with the antenna 228. For example, coaxial cables 270, 272 support a first sector, coaxial cables 274, 276 support a second sector, and coaxial cables 278, 280 support a third sector. Each coaxial cable 270, 272, 274, 276, 278, 280 is installed through a conduit 271, 273, 275, 277, 279, 281 from the basement 222 to the roof 224. The conduits 271, 273, 275, 277, 279, 281 are typically leased from the owner of the building 220.

In implementation, base station 226 is associated with a migration engine 230 comprising various components that are utilized, in various embodiments, to perform a method of migrating from coaxial cable to hybrid cable base station installations. In one embodiment, the migration engine 230 is a component of the base station 226. In one embodiment, the migration engine 230 is separate from the base station 226. The components 220, in various embodiments, include determination component 232, reduction component 234, removed indication component 236, installed indication component 238, activation component 240, remaining sector component 242, deactivation component 244, notification component 246, service level component 248, and temporary component 250.

Determination component 232 determines a first sector associated with a base station 226 that has the least amount of traffic. Each sector comprises two conduits feeding two coaxial cables from the base station 226 to an antenna. The determination is based on operational measurement data gathered from the base station 226. In one embodiment, all sectors are heavily or equally loaded. In this embodiment, service level component 248 determines the first sector based on requirements associated with a service level agreement and passes this determination onto determination component 232.

Reduction component 234 receives and identification of the determined sector from determination component 232 and reduces a channel count associated with that sector. The reduction in channel count facilitates all transmits associated with the determined sector to fit on a single coaxial cable associated with the determined sector. This reduction in channel count results in a first unused conduit, a first unused coaxial cable, a first used conduit, and a first used coaxial cable for the determined sector. As can be appreciated, the first used coaxial cable is the single coaxial cable associated with the determined sector now handling all transmits for that sector. This allows the first unused coaxial cable to be removed without causing any downtime or outage for the determined sector.

Removed indication component 236 receives an indication when unused coaxial cable has been removed. The indication is communicated, in one embodiment, by an operator to migration engine 230. In another embodiment, the indication is communicated when the first unused coaxial cable is disconnected from the base station 226, the antenna 228, or both. Once the first unused coaxial cable is removed, the first unused conduit is empty and ready to receive a hybrid cable.

Installed indication component 238 receives an indication that a first hybrid cable has been installed in the first unused conduit. The indication is communicated, in one embodiment, by an operator to migration engine 230. In another embodiment, the indication is communicated when the first hybrid cable is connected to the base station 226, the antenna 228, or both.

Activation component 240 activates the first hybrid cable so that all traffic for the determined sector is moved from the first used coaxial cable to the first hybrid cable. A single hybrid cable is capable of communicating and receiving all traffic that normally requires two coaxial cables. Once the first hybrid cable is activated, the first used coaxial cable is no longer needed and all traffic associated with the determined sector is now active on the first hybrid cable.

In one embodiment, remaining sector component 242 receives an indication from activation component 240 that a hybrid cable has been installed and activated. Remaining sector component 242 then determines whether there are any remaining sectors that are not supported by a hybrid cable. In other words, remaining sector component 242 identifies whether any sectors are still supported by a pair of coaxial cables.

In one embodiment, deactivation component 244 deactivates any inactive coaxial cables for a particular sector. For example, when reduction component reduces a channel count associated with a determined sector so that all transmits fit on a single coaxial cable, an unused coaxial cable results. Deactivation component deactivates that inactive coaxial cable which indicates that the inactive coaxial cable can be removed.

In one embodiment, notification component 246 receives a notification from deactivation component 244 that alerts an operator that a coaxial cable is ready to be removed. In one embodiment, notification component 246 receives a notification from activation component 240 that a hybrid cable is supporting all the traffic for a particular sector. This indicates that any coaxial cables still in place for that particular sector can be removed.

In one embodiment, temporary component 250 temporarily moves at least a portion of traffic associated with the determined sector to another sector if all sectors are heavily or equally loaded. This allows, if necessary, reduction component 234 to reduce the channel count associated with the determined sector so that all transmits fit on a single coaxial cable. For example, if all the traffic associated with the determined sector can be moved temporarily to another sector, temporary component 250 moves the traffic accordingly. However, if only a portion of the traffic can be moved, temporary component 250 moves that portion and reduction component 234 reduces the channel count. This combination allows all transmits associated with the determined sector to fit on a single coaxial cable.

Figure 3:
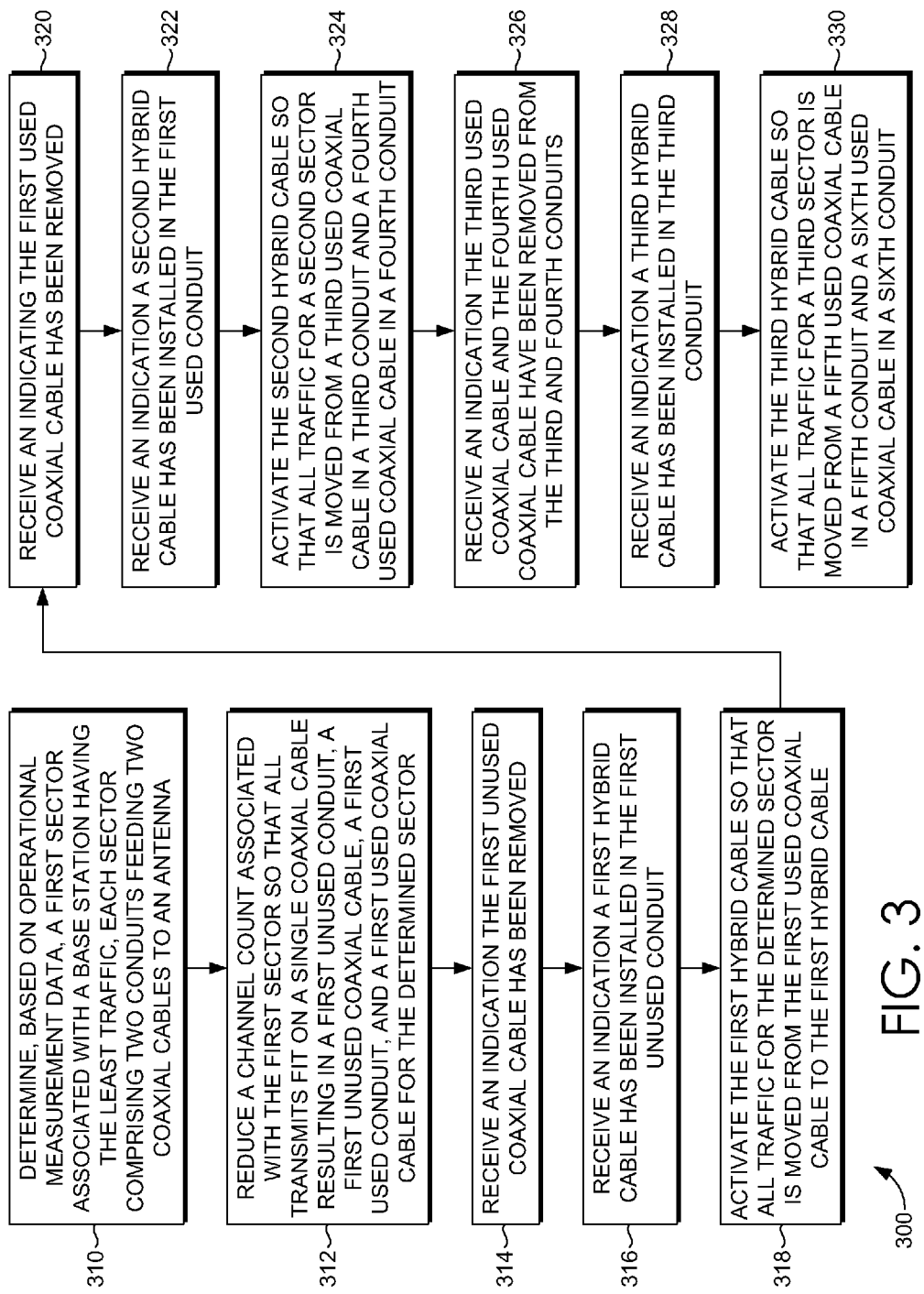
FIG. 3 is a flow diagram depicting an illustrative method of migrating from coaxial cable to hybrid cable base system installations, in accordance with embodiments of the invention.

Referring now to FIG. 3, a flow diagram depicts a method 300 of migrating from coaxial cable to hybrid cable base station installations, in accordance with embodiments of the invention. In one embodiment, the base station is being replaced. In one embodiment, the base station is being migrated from a ground based system to a roof top based network vision deployment. In one embodiment, the replacement or migration is accomplished with zero or partial downtime.

At step 310, based on operational measurement data, a first sector associated with a base station having the least traffic is determined. Each sector is supported by two conduits feeding two coaxial cables to an antenna.

In one embodiment, the first sector is determined based on requirements associated with a service level agreement if all sectors are heavily loaded. In one embodiment, at least a portion of traffic associated with a first sector is temporarily moved to another sector if all sectors are heavily loaded. In one embodiment, temporarily moving at least a portion of traffic comprises moving a minimal amount of traffic so that reducing a channel count for the first sector allows all transmits to fit on a single coaxial cable associated with the first sector.

At step 312, a channel count associated with the first sector is reduced so that all transmits fit on a single coaxial cable resulting in a first unused conduit, a first unused coaxial cable, a first used conduit, and a first used coaxial cable for the determined sector. The transmits fit on the first used coaxial cable which renders the first unused coaxial cable no longer necessary to support the first sector. Consequently, the first unused coaxial cable can be removed.

An indication the first unused coaxial cable has been removed is received at step 314. The indication is received, in one embodiment, from the base station when the coaxial cable is disconnected from the base station, the antenna, or both. In another embodiment, the indication is received from an operator. Once the indication is received, a hybrid cable can be installed in place of the removed unused coaxial cable.

At step 316, an indication is received that a first hybrid cable has been installed in the first unused conduit. The indication is received, in one embodiment, from an operator. In another embodiment, the indication is received when the first hybrid cable is connected to the base station, the antenna, or both.

The first hybrid cable is activated, at step 318, so that all traffic for the determined sector is moved from the first used coaxial cable to the first hybrid cable. The single hybrid cable is capable of communicating and receiving all traffic that normally requires two coaxial cables. Once the first hybrid cable is activated, the first used coaxial cable is no longer needed and all traffic associated with the determined sector is now active on the first hybrid cable.

At step 320, an indicating the first used coaxial cable has been removed is received. The indication is received, in one embodiment, from an operator. In another embodiment, the indication is received when the first used coaxial cable is removed from the base station, the antenna, or both.

An indication that a second hybrid cable has been installed in the first used conduit is received at step 322. The indication is received, in one embodiment, from an operator. In another embodiment, the indication is received when the second hybrid cable is connected to the base station, the antenna, or both.

The second hybrid cable is activated, at step 324, so that all traffic for a second sector is moved from a third used coaxial cable in a third conduit and a fourth used coaxial cable in a fourth conduit. Once the traffic for the second sector has been moved to the second hybrid cable, the third and fourth used coaxial cables can be removed from the third and fourth conduits.

At step 326, an indication the third used coaxial cable and the fourth used coaxial cable have been removed from the third and fourth conduits is received. The indication is received, in one embodiment, from an operator. In another embodiment, the indication is received when the third and fourth used coaxial cables are removed from the base station, the antenna, or both.

An indication that a third hybrid cable has been installed in the third used conduit is received at step 328. The indication is received, in one embodiment, from an operator. In another embodiment, the indication is received when the third hybrid cable is connected to the base station, the antenna, or both. The third hybrid cable is activated, at step 330, so that all traffic for a third sector is moved from a fifth used coaxial cable in a fifth conduit and a sixth used coaxial cable in a sixth conduit. At this point, all traffic for all sectors has now been moved to hybrid cables and the remaining coaxial cables can be removed.

Figure 4:
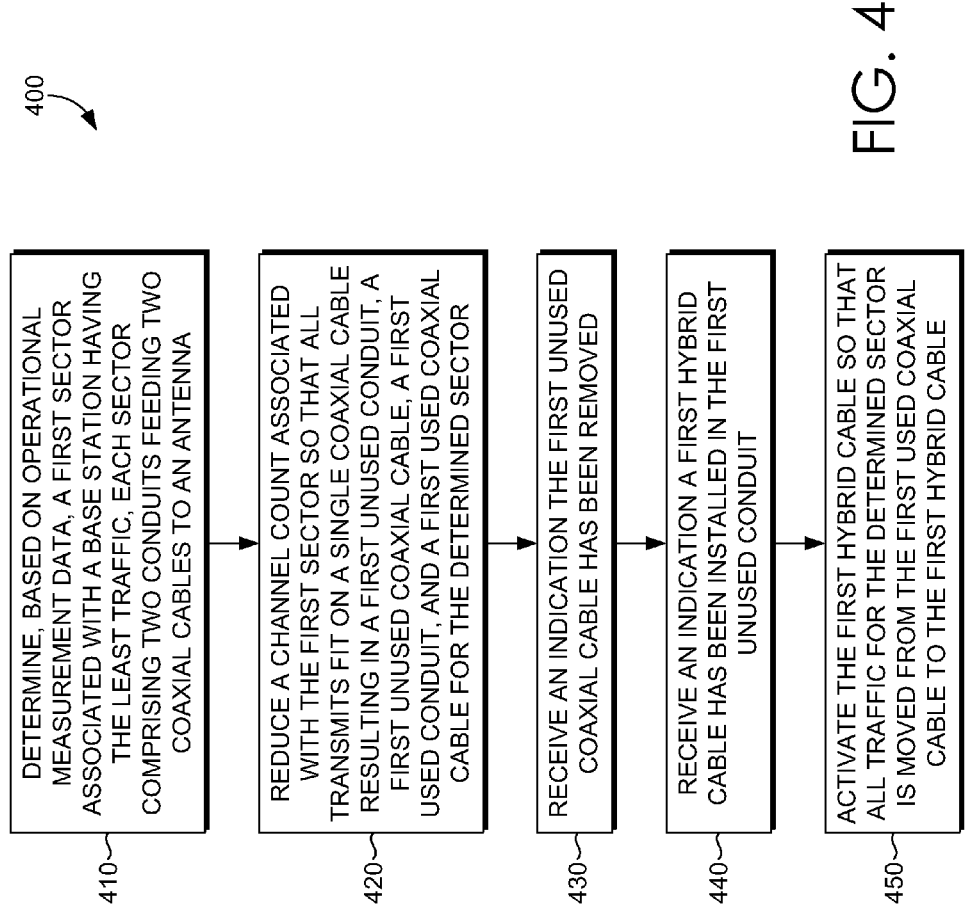
FIG. 4 is a flow diagram depicting an illustrative method of migrating from coaxial cable to hybrid cable base system installations, in accordance with embodiments of the invention.

Referring now to FIG. 4, a flow diagram depicts an illustrative method 400 of migrating from coaxial cable to hybrid cable base station installations, in accordance with an embodiment of the present invention. Initially, at step 410, a first sector associated with a base station having the least traffic is determined. The determination is based on operational measurement data. In one embodiment, the first sector is determined based on requirements associated with a service level agreement if all sectors are heavily loaded. In one embodiment, at least a portion of traffic associated with a first sector is temporarily moved to another sector if all sectors are heavily loaded. In one embodiment, temporarily moving at least a portion of traffic comprises moving a minimal amount of traffic so that reducing a channel count for the first sector allows all transmits to fit on a single coaxial cable associated with the first sector. In embodiments, each sector is supported by two conduits feeding two coaxial cables to an antenna.

A channel count associated with the first sector is reduced, at step 420, so that all transmits fit on a single coaxial cable resulting in a first unused conduit, a first unused coaxial cable, a first used conduit, and a first used coaxial cable for the determined sector. The unused coaxial cable can be removed. Once the first unused coaxial cable is removed, an indication is received at step 430. The indication is received, in one embodiment, from the base station when the coaxial cable is disconnected from the base station, the antenna, or both. In another embodiment, the indication is received from an operator.

After the indication is received, a hybrid cable can be installed in place of the removed unused coaxial cable. An indication that the first hybrid cable has been installed in the first unused conduit at step 440. The indication is received, in one embodiment, from the base station when the hybrid cable is connected to the base station, the antenna, or both. In another embodiment, the indication is received from an operator.

At step 450, the first hybrid cable is activated so that all traffic for the determined sector is moved from the first used coaxial cable to the first hybrid cable. In one embodiment, the process is repeated until all coaxial cables have been removed and hybrid cables have been installed so that traffic for all sectors is moved to hybrid cables. In embodiments, an indication is received, as described herein, each time a coaxial cable is removed or a hybrid cable is installed. After each hybrid cable is installed, the newly installed hybrid cable is activated. In one embodiment, the migration or replacement is accomplished with zero or partial down-time for any sector associated with the base station. In embodiments, each hybrid cable replaces two coaxial cables for each sector, freeing up half the conduits required for a typical coaxial cable installation. The freed conduits can be reallocated for other use or the providers can end the leases associated with the conduits.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Non-transitory computer storage media having computer-executable instructions embodied thereon that, when executed by one or more computing devices, cause the one or more computing devices to perform operations comprising:
   determining, based on operational measurement data, a first sector associated with a base station that is being replaced, the first sector having a least traffic, wherein more than one sector is associated with the base station and each sector is supported by two conduits feeding two coaxial cables to an antenna;
   reducing a channel count associated with the first sector so that all transmits fit on a single coaxial cable of the two coaxial cables resulting in a first unused conduit of the two conduits, a first unused coaxial cable of the two coaxial cables, a first used conduit of the two conduits, and a first used coaxial cable of the two coaxial cables for the first sector;
   receiving an indication that the first unused coaxial cable has been removed;
   receiving an indication that a first hybrid cable has been installed in the first unused conduit;
   activating the first hybrid cable so that all traffic for the determined sector is moved from the first used coaxial cable to the first hybrid cable;
   receiving an indicating that the first used coaxial cable has been removed;
   receiving an indication that a second hybrid cable has been installed in the first used conduit;
   activating the second hybrid cable so that all traffic for a second sector is moved from a third used coaxial cable in a third conduit and a fourth used coaxial cable in a fourth conduit;
   receiving an indication that the third used coaxial cable and the fourth used coaxial cable have been removed from the third and fourth conduits;
   receiving an indication that a third hybrid cable has been installed in the third conduit; and
   activating the third hybrid cable so that all traffic for a third sector is moved from a fifth used coaxial cable in a fifth conduit and a sixth used coaxial cable in a sixth conduit.

2. The storage media of claim 1, further comprising temporarily moving at least a portion of traffic associated with a first sector to another sector associated with the base station.

3. The storage media of claim 2, wherein the temporarily moving at least the portion of traffic comprises moving a minimal amount of traffic so that reducing a channel count for the first sector allows all transmits associated with the first sector to fit on a single coaxial cable associated with the first sector.

4. The storage media of claim 1, wherein the base station is being migrated from a ground based system to a roof top based network system deployment.

5. The storage media of claim 4, wherein the migration is accomplished with zero down-time.

6. Non-transitory computer storage media having computer-executable instructions embodied thereon that, when executed by one or more computing devices, cause the one or more computing devices to perform operations comprising:
   determining, based on operational measurement data, a first sector associated with a base station that is being replaced, the first sector having a least traffic, wherein more than one sector is associated with the base station and each sector is supported by two conduits feeding two coaxial cables to an antenna;
   reducing a channel count associated with the determined sector so that all transmits associated with the sector fit on a single coaxial cable of the two coaxial cables resulting in a first unused conduit of the two conduits, a first unused coaxial cable of the two coaxial cables, a first used conduit of the two conduits, and a first used coaxial cable of the two coaxial cables for the first sector;

receiving an indication that the first unused coaxial cable has been removed;

receiving an indication that a first hybrid cable has been installed in the first unused conduit; and activating the first hybrid cable so that all traffic for the first sector is moved from the first used coaxial cable to the first hybrid cable.

7. The storage media of claim 6, further comprising:

receiving an indicating that the first used coaxial cable has been removed;

receiving an indication that a second hybrid cable has been installed in the first used conduit; and activating the second hybrid cable so that all traffic for a second sector is moved from a third used coaxial cable in a third conduit and a fourth used coaxial cable in a fourth conduit.

8. The storage media of claim 7, further comprising:

receiving an indication that the third used coaxial cable and the fourth used coaxial cable have been removed from the third and fourth conduits;

receiving an indication that a third hybrid cable has been installed in the third conduit; and activating the third hybrid cable so that all traffic for a third sector is moved from a fifth used coaxial cable in a fifth conduit and a sixth used coaxial cable in a sixth conduit.

9. The storage media of claim 6, further comprising temporarily moving at least a portion of traffic associated with the first sector to another sector associated with the base station.

10. The storage media of claim 9, wherein the temporarily moving at least the portion of traffic comprises moving a minimal amount of traffic so that reducing a channel count for the first sector allows all transmits associated with the first sector to fit on a single coaxial cable associated with the first sector.

11. The storage media of claim 8, wherein a migration is accomplished with zero down-time for any sector associated with the base station.

12. A computer system for migrating from a coaxial cable to hybrid cable base station installations, the computer system comprising a processor coupled to a non-transitory computer storage medium, the non-transitory computer storage medium having stored thereon a plurality of computer software components executed by the processor, the computer software components comprising:

a determination component for determining, based on operational measurement data, a first sector associated with a base station, the first sector having a least traffic, wherein more than one sector is associated with the base station and each sector is supported by two conduits feeding two coaxial cables to an antenna;

a reduction component for reducing a channel count associated with the first sector so that all transmits associated with the first sector fit on a single coaxial cable of the two coaxial cables resulting in a first unused conduit of the two conduits, a first unused coaxial cable of the two coaxial cables, a first used conduit of the two conduits, and a first used coaxial cable of the two coaxial cables for the first sector;

an removed indication component for receiving an indication when an unused coaxial cable has been removed from a conduit;

an installed indication component for receiving an indication when a hybrid cable has been installed in a conduit;

an activation component for activating the hybrid cable after the installed indication component indicates the hybrid cable has been installed; and a remaining sector component that, upon receiving an indication from the activation component that a hybrid cable has been installed determines whether there are any remaining sectors of the base station that are not supported by the hybrid cable.

13. The computer system of claim 12, further comprising a notification component that receives a notification alerting an operator that a coaxial cable of the two coaxial cables is ready to be removed.

14. The computer system of claim 12, further comprising a temporary component that temporarily moves at least a portion of traffic associated with the first sector to another sector associated with the base station.

\* \* \* \* \*